(12) United States Patent        (10) Patent No.:     US 7,177,472 B2
Karidi et al.                    (45) Date of Patent:      Feb. 13, 2007

(54) METHOD AND APPARATUS FOR TEXT DETECTION

(75) Inventors: Ron J. Karidi, Chicago, IL (US); Lai Chee Man, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 278 days.

(21) Appl. No.: 10/887,940

(22) Filed: Jul. 9, 2004

(65) Prior Publication Data

US 2004/0240736 A1    Dec. 2, 2004

Related U.S. Application Data

(63) Continuation of application No. 09/808,791, filed on Mar. 14, 2001, now Pat. No. 6,778,700.

(51) Int. Cl.
*G06K 9/34*    (2006.01)

(52) U.S. Cl. .................. 382/176; 382/199; 358/462

(58) Field of Classification Search ............... 382/169, 382/170, 171, 176, 199; 358/462
See application file for complete search history.

(56) References Cited

U.S. PATENT DOCUMENTS

| 3,593,287 A | * | 7/1971 | Kobayashi et al. ......... 382/202 |
| 5,031,113 A | | 7/1991 | Hollerbauer |
| 5,058,182 A | * | 10/1991 | Kuan et al. ................ 382/202 |
| 5,212,741 A | | 5/1993 | Barski et al. |
| 5,235,652 A | | 8/1993 | Nally |
| 5,251,023 A | | 10/1993 | Arimoto et al. |
| 5,293,430 A | | 3/1994 | Shiau et al. |
| 5,513,304 A | | 4/1996 | Spitz et al. |
| 5,579,414 A | | 11/1996 | Fast et al. |
| 5,590,224 A | | 12/1996 | Fast et al. |
| 5,594,814 A | | 1/1997 | Fast et al. |
| 5,594,815 A | | 1/1997 | Fast et al. |
| 5,594,817 A | | 1/1997 | Fast et al. |
| 5,625,719 A | | 4/1997 | Fast et al. |
| 5,715,469 A | | 2/1998 | Arning |
| 5,757,963 A | | 5/1998 | Ozaki et al. |
| 5,778,103 A | | 7/1998 | Allan et al. |
| 5,787,195 A | * | 7/1998 | Tsujimoto et al. .......... 382/176 |
| 5,852,678 A | | 12/1998 | Shiau et al. |
| 5,867,494 A | | 2/1999 | Krishnaswamy et al. |
| 5,883,636 A | | 3/1999 | Hayashi et al. |
| 5,912,672 A | | 6/1999 | Liguori |

(Continued)

FOREIGN PATENT DOCUMENTS

EP     0 682 319 A2    11/1995

OTHER PUBLICATIONS

Malik et al., "Extraction of Text Images," Proceedings 1999 International Conference on Information Intelligence and Systems, IEEE Comput. Soc., pp. 534-537, Oct. 31, 1999.

(Continued)

*Primary Examiner*—Vikkram Bali
*Assistant Examiner*—Anand Bhatnagar
(74) *Attorney, Agent, or Firm*—James Trosino

(57) ABSTRACT

A text detection technique comprises local ramp detection, identification of intensity troughs (candidate text strokes), determination of stroke width, preliminary detection of text based on contrast and stroke width, and a consistency check.

22 Claims, 4 Drawing Sheets

U.S. PATENT DOCUMENTS

| | | |
|---|---|---|
| 5,963,676 A | 10/1999 | Wu et al. |
| 5,987,221 A | 11/1999 | Bearss et al. |
| 6,101,274 A | 8/2000 | Pizano et al. |
| 6,157,736 A | 12/2000 | Jodoin et al. |
| 6,160,913 A | 12/2000 | Lee et al. |
| 6,173,073 B1 | 1/2001 | Wang |
| 6,175,425 B1 | 1/2001 | Khorram |
| 6,438,265 B1 | 8/2002 | Heilper et al. |
| 2002/0039444 A1* | 4/2002 | Yamagata et al. .......... 382/199 |

OTHER PUBLICATIONS

Zhou et al., "Extracting Test From WWW Images," Proceedings 4th Int'l Conference on Document Analysis and Recognition, IEEE Comp. Soc., vol. II, pp. 248:252, Aug. 18, 1997.

* cited by examiner

METHOD AND APPARATUS FOR TEXT DETECTION

REFERENCE TO RELATED APPLICATIONS

This application is a continuation of U.S. application Ser. No. 09/808,791, filed 14 Mar. 2001, now U.S. Pat. No. 6,778,700.

BACKGROUND

The invention relates to text that is contained in transmitted pages. More particularly, the invention relates to a method and apparatus for segmenting a scanned page into text and non-text areas.

Text or pictorial images are often replicated or transmitted by a variety of techniques, such as photocopying, facsimile transmission, and scanning of images into a memory device. The process of replication or transmission often tends to degrade the resulting image due to a variety of factors. Degraded images are characterized by indistinct or shifted edges, blended or otherwise connected characters, and distorted shapes.

A reproduced or transmitted image that is degraded in quality may be unusable in certain applications. For example, if the reproduced or transmitted image is to be used in conjunction with a character recognition apparatus, the indistinct edges and/or connected characters may preclude accurate or successful recognition of characters in the image. Also, if the degraded image is printed or otherwise rendered visible, the image may be more difficult to read and less visually distinct.

There are several approaches to improving image quality. One known resolution enhancement algorithm provides template matching. Template matching attempts to match a line, curve pattern, or linear pattern and then tries to find the best way to reconstruct it within the available printing resolution.

Other methods for text enhancement come from the area of Optical Character Recognition (OCR). The main purpose of OCR is to isolate the characters within a block of text from one another. Such methods are more related to morphological filters that repetitively perform thickening and thinning and opening and closing to get the desired character shape.

J. Shiau, Z. Fan, and R. J. Clark, Detection And Rendering Of Text In Tinted Areas; U.S. Pat. No. 5,852,678 (Dec. 22, 1998) and related European Patent Application No. EP 0810774, Detection And Rendering Of Text In Halftone Tinted Areas, (Dec. 12, 1997) disclose a method and apparatus that improves digital reproduction of a compound document image containing half-tone tint regions and text and/or graphics embedded within the half-tone tint regions. The method entails determining a local average pixel value for each pixel in the image, then discriminating and classifying based on the local average pixel values, text/graphics pixels from half-tone tint pixels. Discrimination can be effected by calculating a range of local averages within a neighborhood surrounding each pixel; by calculating edge gradients based on the local average pixel values; or by approximating second derivatives of the local average pixel values based on the local averages. Text/graphics pixels are rendered using a rendering method appropriate for that type of pixel; half-tone tint pixels are rendered using a rendering method appropriate for that type of pixel.

L. L. Barski and R. S. Gaborski, Preprocessing Of Dot-Matrix/Ink-Jet Printed Text For Optical Character Recognition, U.S. Pat. No. 5,212,741 (May 18, 1993) disclose a method and apparatus for processing image data of dot-matrix/ink-jet printed text to perform OCR of such image data. In the method and apparatus, the image data are viewed for detecting if dot-matrix/ink-jet printed text is present. Any detected dot-matrix/ink-jet produced text is then pre-processed by determining the image characteristic thereof by forming a histogram of pixel density values in the image data. A 2-D spatial averaging operation as a second pre-processing step smooths the dots of the characters into strokes and reduces the dynamic range of the image data. The resultant spatially averaged image data is then contrast stretched in a third pre-processing step to darken dark regions of the image data and lighten light regions of the image data. Edge enhancement is then applied to the contrast stretched image data in a fourth pre-processing step to bring out higher frequency line details. The edge enhanced image data is then binarized and applied to a dot-matrix/ink jet neural network classifier for recognizing characters in the binarized image data from a predetermined set of symbols prior to OCR.

The prior art teaches global techniques aimed at intelligent binarization, OCR, and document image analysis. It does not teach nor suggest local techniques aimed at text and graphic outlines as opposed to the entire text and graphics region.

It would be advantageous to provide a technique that detects text outline and line art in a color document image.

It would also be advantageous to provide a technique that provides good color reproduction of document images that contain text.

It would also be advantageous to provide a text detection technique that is simple and less computationally intensive, i.e., that requires no complex feature vectors, no transforms, no color clustering, and no cross-correlation, and thereby is suitable for high resolution scans.

It would also be advantageous to provide a text detection technique that is local, i.e., that does not require the scanning of an entire document before processing, and that is thereby fast. It would be desirable for processing to begin as the document is being scanned. Part of a character can be processed without needing the entire character. In such approach, neither the text character nor the entire word would be recognized.

It would also be advantageous to provide a text detection technique that uses adaptive thresholds on text stroke width.

It would also be advantageous to provide a text detection technique that provides important information, such as stroke width and background estimate, that may be used for a subsequent text enhancement procedure.

It would also be advantageous to provide a text detection technique that handles text on light half-tone background.

It would also be advantageous to provide a text detection technique that handles very thin text blurred by a device, such as by a scanner.

It would also be advantageous to provide a text detection technique in which a high local contrast requirement could reduce errors in detection so that they are not easily perceivable after enhancement.

SUMMARY

A text detection method and apparatus is provided that comprises the following five logical components: 1) local ramp detection; 2) identification of intensity troughs (candidate text strokes); 3) determination of stroke width; 4)

preliminary detection of text based on contrast and stroke width; and 5) a consistency check.

DETAILED DESCRIPTION

Figure 1A:
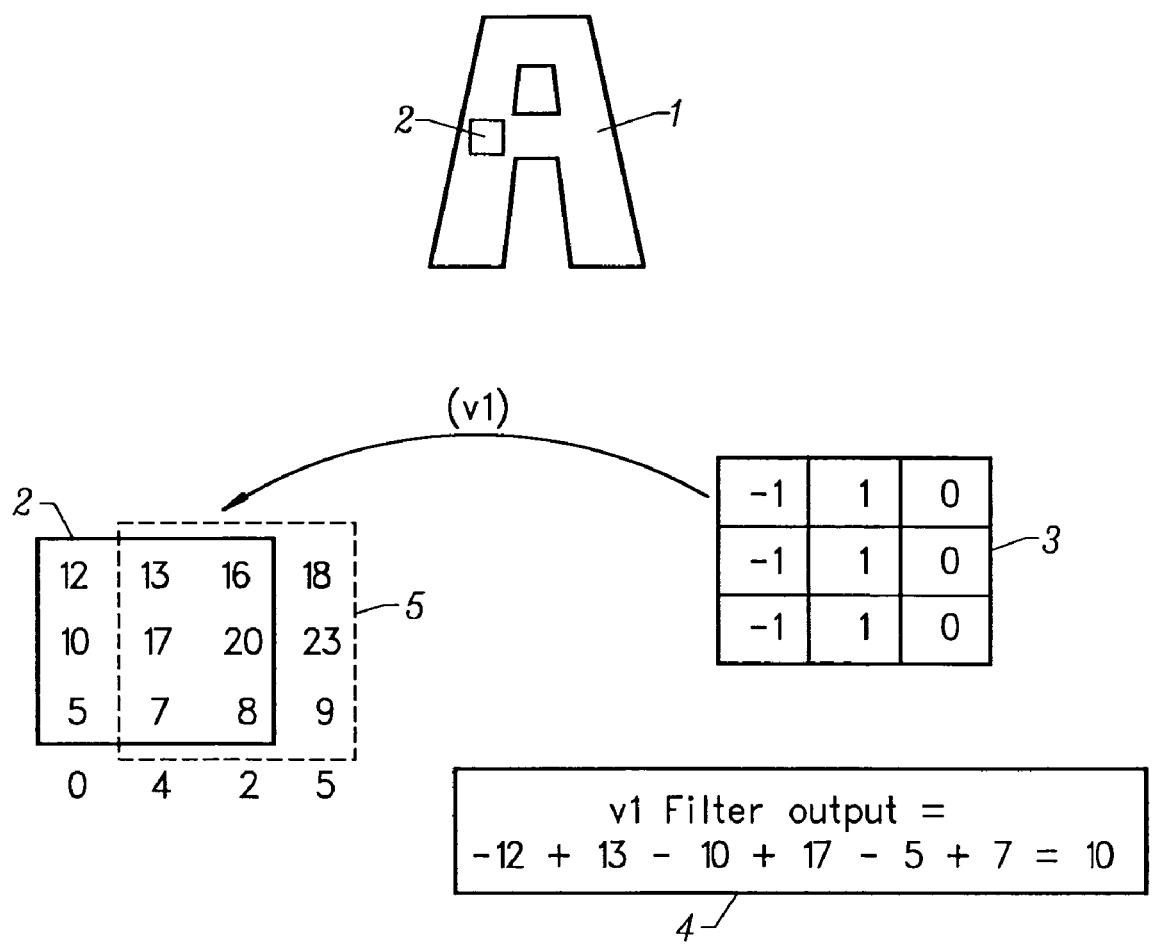
FIG. 1A shows an example of applying a vertical filter to a 3×3 pixel region according to the invention.

One goal of the preferred embodiment of the invention is to segment a scanned page into text and non-text areas, for example, where text is subsequently to be processed differently than the non-text. Another goal of the preferred embodiment of the invention is to provide input for further processing of the detected text areas, such as, for example, by a subsequent text enhancement system that improves the sharpness of text outlines.

In the preferred embodiment of the invention, a text detection method and apparatus is provided that comprises the following five logical components: 1) local ramp detection; 2) identification of intensity troughs (candidate text strokes); 3) determination of stroke width; 4) preliminary detection of text based on contrast and stroke width; and 5) a consistency check. These components of the invention are discussed in detail below.

The text detection technique disclosed herein (also referred to interchangeably herein as an algorithm) is based on the observation that text outlines have very high contrast in return to the background. Therefore, a region is labeled text if, in the region, very strong contrast in the form of relatively sharp edges is observed, and provided that the dark side is also close to being neutral in color, i.e., the color saturation is small. The text detection technique described herein is therefore applicable to any of black text on white background, black text on color background, and white or light text on dark background (reverse text). The technique described herein typically does not detect half-tone text because in this case sharp edges cannot be detected reliably. However, the fact that the technique described herein typically does not detect half-tone text is not considered to be a disadvantage because high quality text generally is not half-toned, and it is such high quality text that becomes degraded most as a result of scanning.

In a preferred embodiment gray level, i.e., scanned intensity, information is input to the discussed text detection algorithm because the technique herein disclosed depends mainly on contrast for text detection. In other embodiments of the invention, e.g., using a color printer as a target device, two additional pieces of information are used to improve the detection accuracy further. They are: 1) a measure of the color saturation; and 2) a local indicator of the presence of half-tone pixels. These additional pieces of information do not need to be included for text detection where the intended target device is a black and white printer.

In the case of a color printer target device, the measure of the color saturation is estimated through a preliminary step of single pixel processing, provided that color information from the scanner is available. Such processing is used mainly to prevent the subsequent text enhancement system mentioned above from enhancing colored text with a black ink outline. According to the invention herein, a region is labeled text if in the region very strong contrast in the form of relatively sharp edges is observed, and provided that the dark side is also close to being neutral in color, i.e., that the color saturation is small.

In the case of a gray scale scanner, there is no color information. In this case, all dark text is enhanced with a black outline as desired.

The local indicator of the presence of half-tone pixels is obtained through a general algorithm for half-tone detection. The local indicator is not critical for the functioning of the detection algorithm herein described and so can be waived if not readily available.

In the preferred embodiment of the invention, regions of a scanned page that do not contain text but that contain very strong contrast can also be detected as text. This situation does not present a problem because typically only a very thin black outline is added to detected text. For example, the subsequent text enhancement system discussed above adds a very thin black outline to detected text. Therefore, a high local contrast requirement and an adding of only a very thin black outline implicitly guarantee that errors in text detection are not easily perceivable after enhancement.

A blurring of scanned text due to scanner resolution limitations tends to reduce observable local contrast and hence detection accuracy, especially in the case of thin text. This situation presents an issue that requires explicit treatment in the algorithm discussed below through three pre-processing steps for thin text.

In the preferred embodiment of the invention, the text detection algorithm comprises the following five steps:

1) Local ramp detection;
2) Identification of intensity troughs (candidate text strokes);
3) Determination of stroke width;
4) Preliminary detection of text based on contrast and stroke width; and
5) Consistency check.

Steps 1)–3) are pre-processing steps for thin text, and steps 4)–5) are contrast based steps. It is also noted that in another equally preferred embodiment of the invention, the pre-processing steps for thin text can be omitted. That is, only steps 4) (without measuring stroke width) and step 5) need to be performed.

For each step 1)–5), the means for implementation may vary greatly, and yet remain within the scope of the invention. The presently preferred implementation for each step is provided below in pseudo-code form, except for step 1), which provides preferred matrices of coefficients and a mechanism for calculating an output using the matrices. One skilled in the art can readily implement the pseudo-code in hardware or software, as preferred.

A detailed description of each step is given in the appropriate section herein below.

Step 1: Local Ramp Detection

Scanned intensity values are required as input into this first step. Refer to the discussion of FIG. 1A below for an example of input. Nine different 3×3 high-pass filters are used to detect the presence of steep ramps or edges. For purposes of the discussion herein, a filter is a window of values centered on a pixel, whereby a filtered output is generated using all or some of the values of the window. After a filtered output is generated for the current or centered pixel, the window (filter) is moved across, typically over to the left or right one pixel, or up or down one pixel, and centers itself on another pixel to generate a filtered output for that other pixel. The kernels of these nine filters are depicted in Table A herein below. For purposes of the discussion herein, a kernel is a matrix of coefficients of a filter, wherein each coefficient is used in calculating or generating a filtered output.

TABLE A

| v1 | | | v2 | | | v3 | | | |
|---|---|---|---|---|---|---|---|---|---|
| −1 | 1 | 0 | −1 | 1 | 0 | 0 | −1 | 1 | for vertical ramps |
| −1 | 1 | 0 | 0 | −1 | 1 | −1 | 1 | 0 | |
| −1 | 1 | 0 | −1 | 1 | 0 | 0 | −1 | 1 | |

| h1 | | | h2 | | | h3 | | | |
|---|---|---|---|---|---|---|---|---|---|
| −1 | −1 | −1 | −1 | 0 | −1 | 0 | −1 | 0 | for horizontal ramps |
| 1 | 1 | 1 | 1 | −1 | 1 | −1 | 1 | −1 | |
| 0 | 0 | 0 | 0 | 1 | 0 | 1 | 0 | 1 | |

| dv1 | | | dv2 | | | |
|---|---|---|---|---|---|---|
| 1 | 0 | 0 | −1 | −1 | 1 | for diagonal ramps (vertical detection) |
| −1 | 1 | 0 | −1 | 1 | 0 | |
| −1 | −1 | 1 | 1 | 0 | 0 | |

| dh1 | | | dh2 | | | |
|---|---|---|---|---|---|---|
| 1 | −1 | −1 | −1 | −1 | 1 | for diagonal ramps (horizontal detection) |
| 0 | 1 | −1 | −1 | 1 | 0 | |
| 0 | 0 | 1 | 1 | 0 | 0 | |

Note that dv2 = dh2.

The kernels of the nine filters included in Table A are by no means the only enabling kernels. In other embodiments of the invention, one skilled in the art may want to use, for example, fewer kernels, but create the same result by having such kernels be more complicated. That is, the algorithm is flexible because it allows for preferences and tradeoffs in the choice of kernels. The kernels in Table A were found to be simple and fast.

In the preferred embodiment of the invention, a vertical ramp is detected when the filtered output, i.e., the absolute value of any one of v1, v2, or v3, is greater than a threshold value, $T_{ramp}$. FIG. 1A shows an example of applying a vertical filter to a 3×3 pixel region. The algorithm is applied to a text letter A 1. The algorithm is evaluating a 3×3 pixel region within the letter A 2. The 3×3 pixel region being evaluated is enlarged 2 for clarification below the letter A and to the left. The high pass filter v1 3 is applied to the 3×3 pixel region 2. The v1 filter output is calculated 4 yielding an output of 10. After the algorithm is finished with region 2, then the filter is shifted to the right and applied to a second region 5. The sign of the output determines the sign of the ramp. Light to dark is negative and dark to light is positive. The magnitude of the output is quantized in units of $T_{ramp}/3$. It is also the output to the next step as the ramp strength.

Similarly, a horizontal ramp is detected when the output, i.e., the absolute value of any one of h1, h2, or h3, is greater than the threshold value, $T_{ramp}$. If no vertical or horizontal ramp is detected, then the filters for diagonal ramp detection are investigated.

A diagonal ramp is detected in the vertical sense if the output, i.e., the absolute value of dv1 or dv2, is greater than the threshold value, $T_{ramp}$. Similarly, a diagonal ramp is detected in the horizontal sense if the output, the absolute value of dh1 or dh2, is greater than the threshold value, $T_{ramp}$.

It should be appreciated that the software and hardware implementation of local ramp detection may vary greatly without departing from the scope of the invention claimed herein.

Step 2: Identification of Intensity Troughs

In the preferred embodiment of the invention, an intensity trough refers to the pairing of a light ramp to a dark ramp, or negative ramp, and a dark ramp to a light ramp, or positive ramp, close to each other. This represents a thin text stroke. While a western alphabet is discussed herein, the invention also handles other alphabets, such as Japanese Kanji. The purpose of this step is to identify these thin strokes so that in subsequent steps compensation is made for contrast loss as a result of scanner blurring. The case of intensity ridges, i.e., a positive ramp followed by a negative ramp, is not handled in the preferred embodiment of the invention. Intensity ridges can be added readily if accurate detection and enhancement of very thin reverse text is important.

In the preferred embodiment of the invention, identification of intensity troughs is performed through a finite state machine (FSM) algorithm. Scanned pages are swept from left to right to detect vertical troughs and from top to bottom to detect horizontal troughs. The left to right sweep is described below. The procedure for the top to bottom sweep is similar.

For each row in the scanned page, the algorithm starts at state 0 at the leftmost pixel of the row. The sweep procedure sweeps to the right one pixel at a time. The FSM has five possible states, which are listed in Table B below.

TABLE B

State 0: default (i.e., non-text)
State 1: going downhill (negative ramping in intensity)
State 2: bottom of trough (body of text stroke)
State 3: going uphill (positive ramping in intensity)
State 4: end of uphill (reset)

For each pixel, the signed ramp strength result from Stage 1 is used as an input to the FSM algorithm. For sweeping from left to right, only the vertical ramp strength and the diagonal ramp strength detected in the vertical sense is used. As an option, instead of just using the current pixel, when the FSM is in state 0, 1, or 4, the input is taken as the minimum of the signed ramp strengths at the current pixel, the pixel above, and the pixel below. When the FSM is in state 2 or 3, the input is taken as the corresponding maximum. After the FSM has processed the current input, its new state, which can be unchanged, is assigned as the state of the current pixel. The rules for state changes are summarized in the following pseudo-code presented below in Table C.

TABLE C

```
if (state=4) state=0;
if (state=0 AND input<0) new_state=1, count1=input, count2=1;
else if (state=0 AND input>=0) new_state=0;
else if (state=1 AND input<0) new_state=1, count1+=input, count2++;
else if (state=1 AND input=0) new_state=1, count2++;
else if (state=1 AND input>0) new_state=0;
else if (state=2 AND input<0) new_state=2, count1+=input, count2++;
else if (state=2 AND input=0) new_state=2, count2++;
else if (state=2 AND input>0) new_state=3, count1=input, count2=1,
    count3=count2;
else if (state=3 AND input<0) new_state=1, count1=input, count2=1;
```

TABLE C-continued

```
else if (state=3 AND input=0) new_state=3, count2++;
else if (state=3 AND input>0) new_state=3, count1+=input, count2++;
else new_state=state;
if (new_state=1) {
   if (count2>4) new_state=0;
   else if (count1<=-edge_threshold) new_state=2, count2=1;
}
else if (new_state=2) {
   if (count1>max_ramp_strength) new_state=0;
   else if (count2>max_width) new_state=0;
}
else if (new_state=3) {
   if (count2>4) new_state=0;
   else if (count1>=edge_threshold) new_state=4;
}
if (new_state=0) count1=0, count2=0, count3=0;
```

The variable count1 above represents the cumulative ramp strength in units of $T_{ramp}/3$. The variable count2 represents the cumulative duration in pixels of stay in a particular state. The variable count3 is the total duration of stay in state 2 before switching to states 3 or 4. The threshold, $T_{edge}$ is the cumulative ramp strength required for identification of a high-contrast edge. Max_ramp_strength is the maximum ramping allowed, and Max_width is an upper limit to stroke widths that can be detected.

The state at each pixel, its corresponding count2 value, and, if at state 4, the variable count3, are all passed on to the next step for text stroke width determination.

The pseudo-code above in Table C represents the presently preferred embodiment of the invention and is by no means limiting.

Figure 1B:
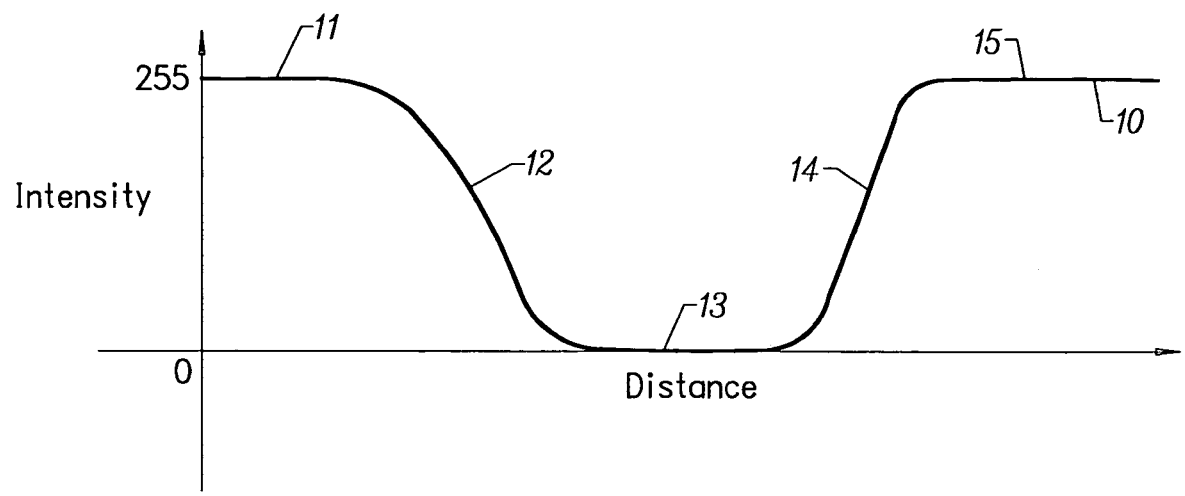
FIG. 1B is a graph of an intensity trough according to the invention.

FIG. 1B is a graph of an intensity trough 10 according to the invention. State 0 occurs in a first region 11 at intensity value 255. State 1 occurs in a second region 12 with negative slope from region 11. State 2 occurs in a third region 13 at the bottom of the trough. State 3 occurs in a fourth region 14 from the bottom of the trough with positive slope to up to level 255. State 4 occurs in the fifth region 15 at level 255.

At states 0, 1, and 4, the method looks for downward slopes, i.e., negative vertical ramps. The algorithm obtains the strongest negative vertical ramp by finding the minimum value among the three negative vertical ramp values. At state 2 and 3, the algorithm looks for upward slopes, i.e., positive vertical ramps. The method obtains the strongest positive vertical ramp by finding the maximum value among the three positive vertical ramp values.

Step 3: Determine Stroke Width

In the preferred embodiment of the invention, two main tasks are performed in this step:

(1) Determine the width and the skeleton of the text stroke in which the current pixel is located; and (2) Detect closely touching text strokes for special treatment in a text enhancement algorithm to avoid merging them.

In another embodiment of the invention, in step (1), a text enhancement (TE) boost flag is also determined. The TE boost flag is a pixel-by-pixel indicator. It indicates for each pixel whether or not to reduce the intensity, i.e., boost the ink level within the text enhancement module to compensate for scanner blurring.

The discussion below pertains to task (1).

Figure 2:
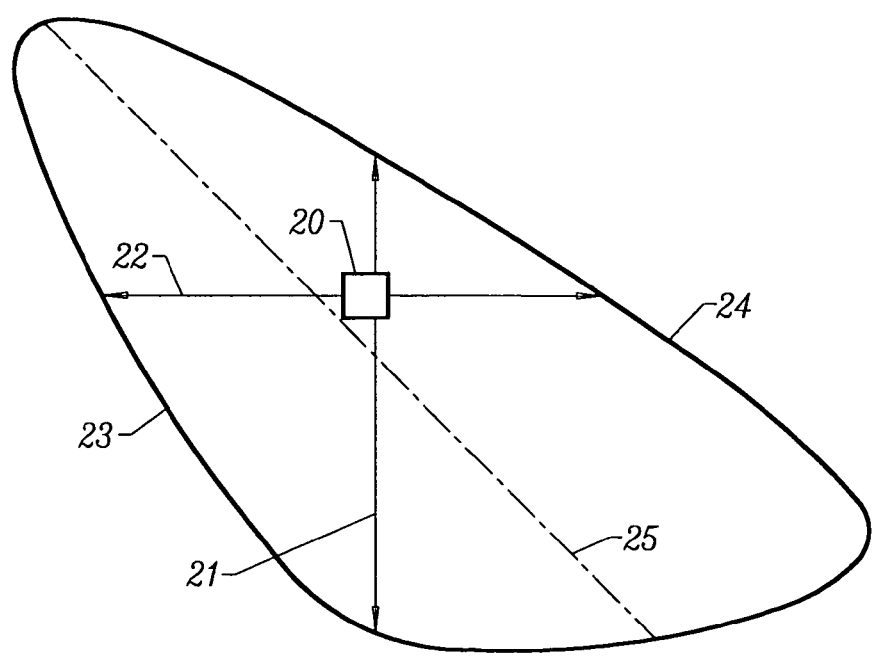
FIG. 2 is a schematic diagram of a text stroke according to the invention.

Referring to FIG. 2, the width of a text stroke at a current pixel 20 is defined as the smaller of the vertical distance 21 or the horizontal distance 22 between the two edges 23, 24 of the stroke. Its skeleton 25 is a line roughly equidistant from both edges 23, 24. In another embodiment of the invention, the TE boost flag is a pixel-by-pixel indicator. It indicates for each pixel whether or not to reduce the intensity, i.e., boost the ink level within the text enhancement module to compensate for scanner blurring.

In the preferred embodiment of the invention, to determine the vertical stroke width 21, Stage 2 results from the left to right sweep, i.e., for detection of vertical troughs, in a 1×N window beginning at the current pixel 20, wherein N=9 in the current implementation, are used. The vertical stroke width 21, the position of the skeleton point in the current window, and, in another embodiment, the TE boost flag, of the current pixel 20 are determined according to the algorithm below in Table D, given in pseudo-code. It is noted that the prefix, v_denotes vertical detection.

TABLE D

```
v_skeleton_flag=0;
v_te_boost_flag=0;
v_crnt_state=v_state[crnt];
v_crnt_count2=v_count2[crnt];
v_next_state=v_state[crnt+1];
if (v_crnt_state=2 OR v_next_state=2 AND v_crnt_state<2 OR
    v_crnt_state>2 AND v_crnt_count2<=2) {
   for (i=0; i<win_size; i++) {
      run_state= v_state[crnt+i];
      if (run_state=4) {
         v_width=v_count3[crnt+i];
         if (v_crnt_state=2 AND
             (v_width=1 OR v_crnt_count2=
             (v_width - v_width/4)))
            v_skeleton_flag=1;
         if (v_crnt_state=2 AND (v_crnt_count2>1 OR
            v_width=1) OR
            v_crnt_state>2 AND
            (v_width=1 AND v_crnt_state=3 AND
             v_crnt_count2=1 OR
             v_width>1 AND (v_crnt_count2=1 AND
             v_crnt_state=3)))
            v_te_boost_flag=1;
         break;
      }
   }
}
```

In the preferred embodiment of the invention, the horizontal stroke width 22, skeleton 25, and, in another embodiment, the TE boost flag, are determined similarly. The implementation used the top to bottom sweep results from Stage 2 as input and is performed on pixels in an N×1 window at the current pixel 20.

The results from the vertical and horizontal paths are assembled to determine a single width, skeleton flag, and, in another embodiment, the TE boost flag, at each pixel, the pseudo-code of which is provided in Table E below.

TABLE E

```
if (v_width<h_width) {
   width=v_width;
   skeleton_flag=v_skeleton_flag;
   te_boost_flag=v_te_boost_flag;
}
else if (h_width<v_width) {
   width=h_width;
   skeleton_flag=h_skeleton_flag;
   te_boost_flag=h_te_boost_flag;
}
else {
   width=v_width;
   skeleton_flag=v_skeleton_flag OR h_skeleton_flag;
   te_boost_flag=v_te_boost_flag OR v_te_boost_flag;
}
```

The following pertains to task (2).

The preferred embodiment of the invention looks for a pattern of dark-light-dark (DLD) in the horizontal or vertical direction within a very small window. Typically, the DLD pattern occurs mainly in between text strokes that became blurred towards one another after scanning. To determine the vertical DLD flag, the procedure is as described below.

An N×M window is centered at a current pixel. The presently preferred embodiment of the invention uses N=7 and M=5. For each column, divide pixels into three disjoint groups: top; middle; and bottom. For N=7, use two pixels, three pixels, and two pixels, respectively, for the three groups. A DLD pattern is detected in the column if the difference between the darkest pixel in the top group and the lightest pixel in the middle group, and the difference between the darkest pixel in the bottom group and the lightest pixel in the middle group are both bigger than a threshold value, $T_{dld}$. Next, the number of DLD detected columns within the window are counted. If the count is bigger than a threshold, which, in the preferred embodiment is two, then the DLD flag of the current pixel is turned on.

In the preferred embodiment of the invention, the determination of the DLD pattern in the horizontal direction is done similarly, but on an M×N window instead. The final DLD flag is turned on when either a horizontal or a vertical DLD pattern is detected. In one equally preferred embodiment of the invention, the flag is passed to a text enhancement module. The module modifies adaptive thresholds used therein to ensure that enhanced text strokes are cleanly separated from one another.

Step 4: Preliminary Marking of Text Pixels

In the preferred embodiment of the invention, this step provisionally decides whether the current pixel is a text pixel based on local contrast present in a N×N window and the width of the text stroke at that pixel. The current implementation uses N=9. Then numerous statistics of the pixels within the N×N window are collected. The list below in Table F comprises, but is not limited to, the collected statistics:

TABLE F

Thresholds used:
  contrast_light_threshold
    - minimum intensity level for text background
  contrast_dark_threshold
    - maximum intensity (minimum darkness) of text to be detected
  boosted_contrast_light_threshold
    - minimum intensity level for text background around crowded text strokes (this is smaller than contrast_light_threshold)
  medium_threshold
    - around 50% intensity
  max_thin_width
    - maximum width of a stroke that is considered thin
  max_very_thin_width
    - maximum width of a stroke that is considered very thin
Statistics collected:
  cnt_thin - number of pixels that are thin (width<=max_thin_width)
  cnt_inner_thin - number of pixels in the center 3 X 3 window that are thin
  cnt_thin_skeleton - number of pixels on a skeleton and are very thin (width<=max_very_thin_width)
  min_width - minimum width among the center 3 X 3 pixels
  min2_width - second smallest width among the center 3 X 3 pixels (will be the same as min_width if more than 1 pixel has the minimum width)
  lightest - highest intensity present in window
  cnt_light - number of light pixels (intensity>=contrast_light_threshold)
  cnt_non_light - number of non-light pixels (intensity<contrast_light_threshold)
  cnt_ht - number of non-light pixels detected as half-toned from a half-tone detection module TABLE F-continued cnt_dark_neutral - number of dark (intensity<=contrast_dark_threshold) and neutral (non-color) pixels
  cnt_dark_clr - number of dark and colored pixels
  cnt_other_clr - number of colored pixels with medium intensity (contrast_dark_threshold<intensity<contrast_light_threshold)
  cnt_boosted_dark_neutral - number of dark and neutral pixels after boosting (boosted_intensity<=contrast_dark_threshold)
  cnt_boosted_dark_clr - number of dark and colored pixels after boosting
  cnt_boosted_other_clr - number of colored pixels with medium intensity after boosting
  cnt_boosted_light - number of light pixels after allowing for a lower contrast (intensity>=boosted_contrast_light_threshold)
  cnt_inner_medium - number of pixels in the center 3 X 3 window that are dark to medium in intensity (intensity<medium_threshold)
  thin_flag - 1 if stroke is thin (cnt_inner_thin>3 OR cnt_thin*4>cnt_non_light), 0 otherwise
  bg_flag - 1 if the center 3 X 3 pixels are all light (intensity>contrast_light_threshold-16), 0 otherwise The list of threshold and statistics above in Table F is by no means limiting. In other embodiments of the invention, the threshold and statistics may vary.

In another embodiment of the invention, boosted intensity of a pixel is the same as original intensity unless width≤max_thin_width. Then, the boosted intensity is the original intensity minus a table look-up value depending on the width. The smaller the width, the more that is subtracted from the original intensity.

In the preferred embodiment of the invention, the current pixel next is determined to be in either one of the following four text categories: Text Outline, Text Body, Background, and Non-text. Table G below gives the algorithm in pseudo-code. It is noted that the thresholds are chosen empirically, i.e., by fine-tuning.

TABLE G

```
if (cnt_dark_neutral>2 AND
    cnt_dark_clr<cnt_dark_clr_threshold AND
    cnt_other_clr<cnt_other_clr_threshold AND
    (cnt_ht*2)<cnt_non_light AND
    cnt_light>1) {
    text_tag=TEXT_OUTLINE;
}
else if (is_thin) {
    if (cnt_boosted_dark_neutral>2 AND
        cnt_boosted_dark_clr<cnt_dark_clr_threshold AND
        cnt_boosted_other_clr<cnt_other_clr_threshold AND
        (cnt_ht*2)<cnt_non_light AND
        (cnt_light>1 OR
        cnt_boosted_light>1 AND
           cnt_thin_skeleton>many_skeleton_threshold)
        )
        text_tag=TEXT_OUTLINE;
}
else if (is_bg) text_tag=BACKGROUND;
else if (cnt_inner_medium==9) text_tag=TEXT_BODY;
else text_tag=NON_TEXT;
```

Different sets of criteria based on stroke width can be used in the algorithm represented in Table G.

In the preferred embodiment of the invention, after the current window finishes processing, its center is moved by J pixels so that a subsampled text tag is determined. That is, each text tag represents the text category of a J×J block of pixels. In the preferred embodiment, J=3.

In addition to the text tag, the lightest intensity detected in the window is passed as input to the next step. In one embodiment of the invention, the TE boost flag is widened by turning it on for the entire block, whenever any of the pixels in the block has its TE boost flag on.

Step 5: Consistency Check and Final Decision

In the preferred embodiment of the invention, in this step regions with text tag=Text Outline are widened to ensure no text is missed while simultaneously performing a consistency check. An N×N window, with N=5 in the preferred embodiment, of text tags, i.e., N×N blocks, each block representing J×J pixels, is used to accumulate the statistics shown in Table H below.

TABLE H cnt_non_text - number of blocks with text_tag=NON_TEXT
cnt_inner_text - number of blocks among the center 3 X 3 blocks with text_tag=TEXT_OUTLINE In the preferred embodiment of the invention, the final decision of the text tag is as follows below in Table I.

TABLE I

```
if (cnt_inner_text AND cnt_non_text<=cnt_non_text_threshold) {
    if (crnt_text_tag=TEXT_BODY) text_tag=TEXT_BODY;
    else text_tag=TEXT_OUTLINE;
}
else {
    if (crnt_text_tag=BACKGROUND) text_tag=BACKGROUND;
    else if (crnt_text_tag=TEXT_BODY) text_tag=TEXT_BODY;
    else text_tag=NON_TEXT;
}
```

In Table I above, cnt_non_text_threshold is the maximum number of non-text blocks allowed in the window to continue to consider the center block as text outline. In another embodiment of the invention, the lightest intensity among the lightest pixels in each block of the window is determined and passed along to a text enhancement module as an estimate of the background intensity level. In the text enhancement module, only text outlines are enhanced.

Figure 3:
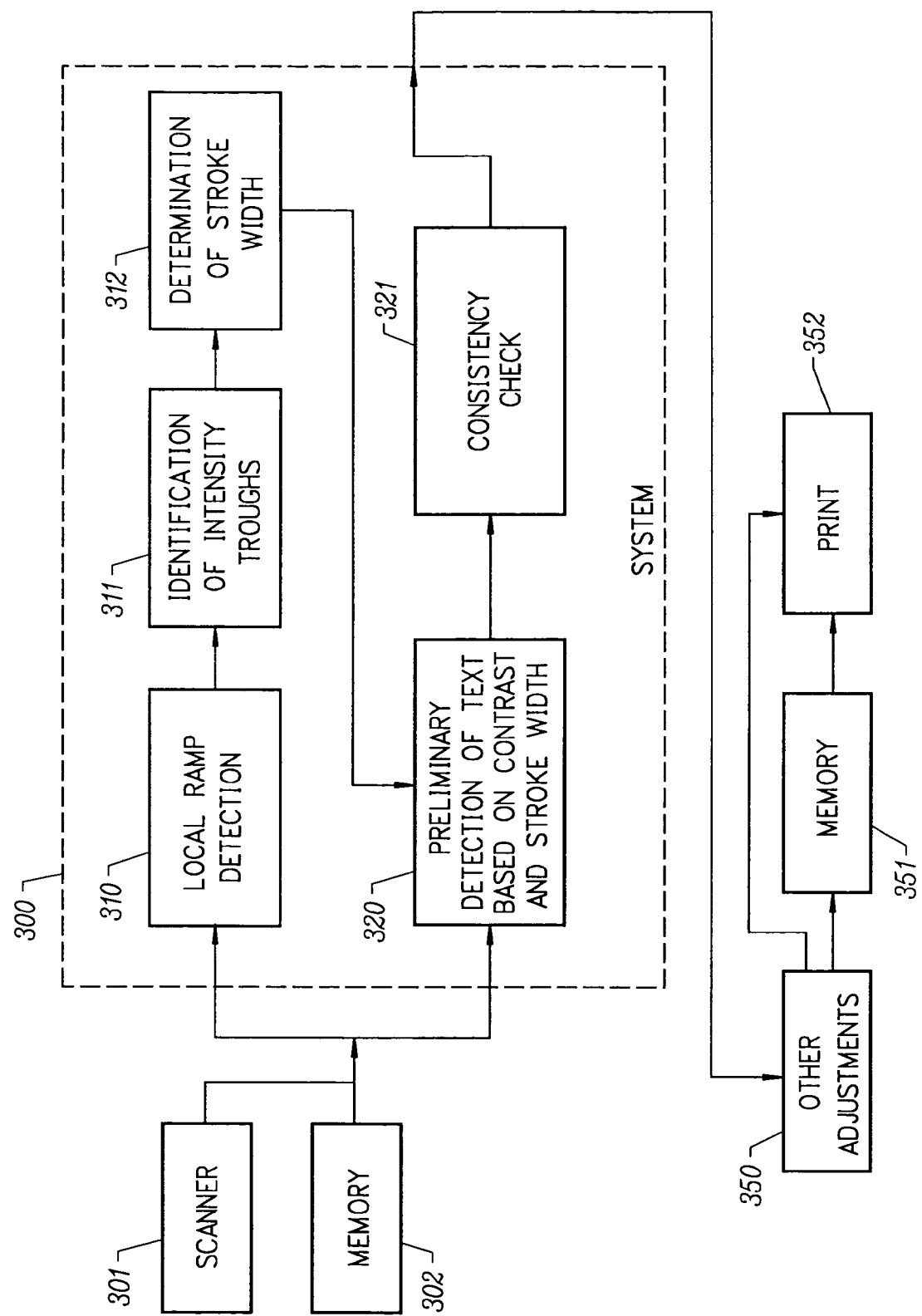
FIG. 3 is a block schematic diagram of a preferred embodiment of an image processing system 300 that includes a contrast based processing module according to the invention.

FIG. 3 is a block schematic diagram of the preferred embodiment of an image processing system 300 that includes a contrast based processing module according to the invention. Image information is provided to the system 300 as scanned intensity values from a scanner 301 or from memory 302, but the invention is not limited to either.

More specifically, the image information is provided either to a local ramp detection module 310, or to a module that performs preliminary detection of text based on contrast and stroke width 320. Output from the local ramp detection module 310 is provided to an identification of intensity troughs module 311. Output from the identification of intensity troughs module 311 is provided to a determination of stroke width module 312. Output from the determination of stroke width module 312 is provided to the preliminary detection of text based on contrast and stroke width module 320. Output from the preliminary detection of text based on contrast and stroke width module 320 is provided to a consistency check module 321. The final output from the system 300, which is the output from the consistency check module 321, is provided for other modules for further adjustments 350. The final results either are stored in memory 351 and then printed 352, or are sent directly for printing 352.

Figure 4A:
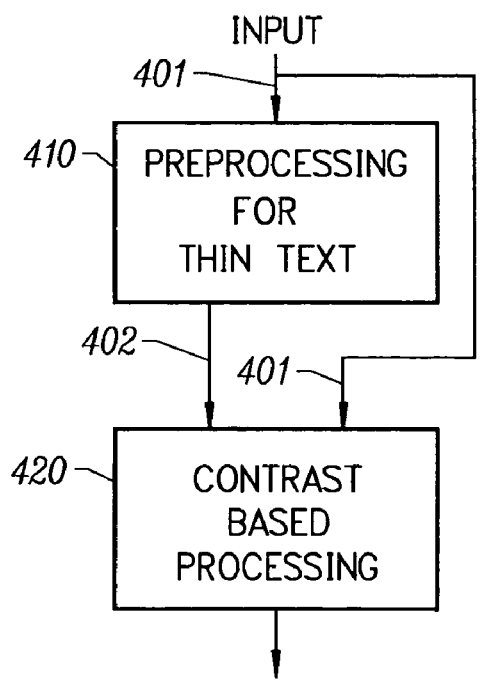
FIG. 4 is a flow diagram of a text detection path that includes a contrast based processing step according to the invention.

FIG. 4a is a flow diagram of a text detection path that includes a contrast based processing component according to the invention. Scanned intensity values are provided as input (401) to the step for preprocessing for thin text (410). Output is then provided (402) to the step for processing based on contrast (420). In another embodiment of the invention, the input is provided (401) directly to the step for processing based on contrast (420), whereby the preprocessing for thin text step (410) is not required.

Figure 4B:
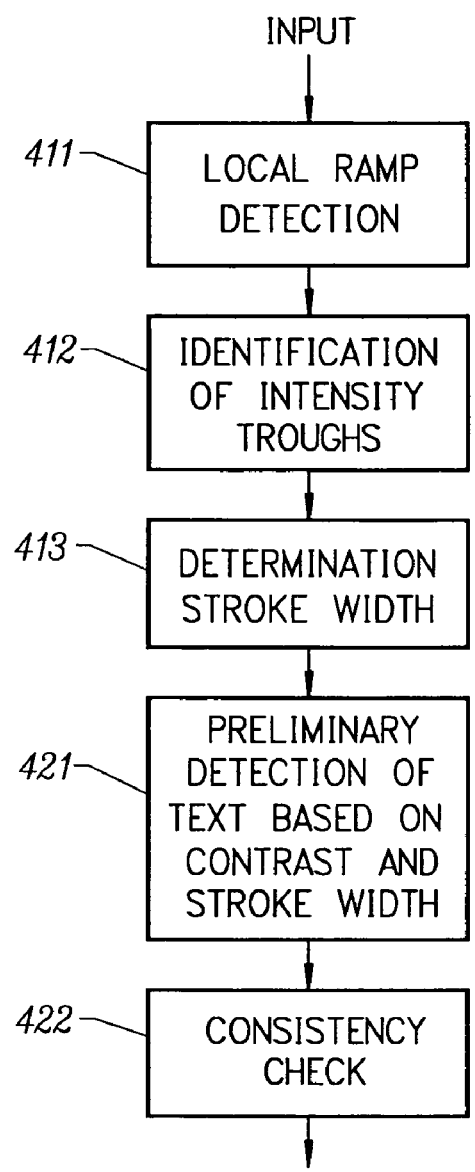

FIG. 4b is a flow diagram of an embodiment of the text detection path of FIG. 4a in which the preprocessing step (410) is further broken down into three separate steps (411–413). They are the local ramp detection step (411), the identification of intensity troughs step (412), and determination of stroke width step (413), respectively. In addition, the contrast based processing step (420) is further broken down into a preliminary detection of text based on contrast and stroke width step (421) and a consistency check step (422).

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method having scanned intensity information as input for detecting text in a scanned page by observing a very strong contrast in a localized region between a dark side and a light side, the method comprising:
   detecting a local ramp;
   identifying an intensity trough using a finite state machine algorithm, the algorithm having a sweeping procedure that sweeps the scanned page from left to right for detecting vertical troughs, and from top to bottom for detecting horizontal troughs;
   determining a stroke width; and
   contrast-based text detection processing;
   wherein the localized region comprises a substantially sharp edge between the dark side and the light side; and
   whereby any of black text on white background, black text on color background, and white or light text on a dark background are detected.

2. The method of claim 1, further comprising measuring a color saturation value and using the value to improve detection accuracy, wherein the color saturation value of the dark side is required to be small.

3. The method of claim 2, further comprising preliminarily single pixel processing to estimate the color saturation value using prior color information provided by the scanner.

4. The method of claim 1, furthering comprising detecting the presence of half-tone pixels by using a local indicator to improve detection accuracy.

5. The method of claim 4, wherein the half-tone detection is obtained through an algorithm for half-tone detection.

6. The method of claim 1, wherein the observing a strong contrast further comprises:
   detecting text preliminarily based on local contrast; and
   consistency checking.

7. The method of claim 1, further comprising:
   detecting a local ramp;
   identifying an intensity trough;
   determining a stroke width;

detecting text preliminarily based on contrast and stroke width; and
consistency checking.

8. A method having scanned intensity information as input for detecting text in a scanned page by observing a very strong contrast in a localized region between a dark side and a light side, the method comprising:
   detecting a local ramp;
   identifying an intensity trough;
   determining a stroke width by:
      determining a width and a skeleton, wherein the width is a distance value and the skeleton is a skeletal line; and
      detecting closely touching text strokes; and
   contrast-based text detection processing;
   wherein the localized region comprises a substantially sharp edge between the dark side and the light side; and
   whereby any of black text on white background, black text on color background, and white or light text on a dark background are detected.

9. The method of claim 8, wherein the width and skeleton determining step further comprises:
   setting the width value to the smaller of a vertical distance and a horizontal distance between two edges of the stroke; and
   determining the skeletal line as a roughly equidistant line from the edges.

10. The method of claim 8, wherein the detecting closely touching text strokes further comprises detecting a pattern of dark-light-dark (DLD) in a horizontal or a vertical direction within a very small window.

11. A method having scanned intensity information as input for detecting text in a scanned page by observing a very strong contrast in a localized region between a dark side and a light side, the method comprising:
   pre-processing for stroke width determination; and
   contrast-based text detection processing by:
      preliminarily detecting text based on local contrast and stroke width;
      deciding whether a current pixel is a text pixel by using the local contrast present in an N×N window having a center over a set of pixels and centered at the current pixel, and stroke width at the current pixel; and
      consistency checking;
   wherein the localized region comprises a substantially sharp edge between the dark side and the light side, and whereby any of black text on white background, black text on color background, and white or light text on a dark background are detected.

12. The method of claim 11, wherein N=9.

13. The method of claim 11, wherein numerous statistics of the pixels within the N×N window are collected by using a set of thresholds.

14. The method of claim 13, wherein the set of thresholds comprises any of:
   a first minimum intensity level for text background;
   a maximum intensity level of text to be detected;
   a second minimum intensity level for text background around crowded text strokes, wherein the second minimum intensity level is smaller than the first minimum intensity level;
   a medium threshold value, wherein the medium threshold value is around 50% intensity;
   a first maximum width of a stroke, wherein the first width is considered thin; and
   a second maximum width of a stroke, wherein the second width is considered very thin; and
wherein the numerous statistics comprise any of:
   a number of pixels that are thin;
   a number of pixels in the center of a 3×3 window that are thin;
   a number of pixels on a skeleton, wherein the skeleton pixels are very thin;
   a minimum width among pixels of the center 3×3 pixels;
   a second smallest width among the pixels of the center 3×3 pixels, wherein the second smallest width is equal to the minimum width among pixels of the center 3×3 pixels if more than 1 pixel has the minimum width;
   a highest intensity present in the N×N window;
   a number of light pixels;
   a number of non-light pixels;
   a number of non-light pixels detected as half-toned from a half-tone detection module;
   a number of dark and neutral pixels;
   a number of dark and colored pixels;
   a number of colored pixels with medium intensity;
   a number of dark and neutral pixels after boosting;
   a number of pixels in the center 3×3 window, wherein the pixels are dark to medium in intensity;
   a thin flag set to 1 if the stroke is thin, or set to zero otherwise; and
   a background flag set to 1 if the center 3×3 pixels are all light, or set to zero otherwise.

15. The method of claim 13, further comprising determining if the current pixel is in a category of a set of predetermined categories using an associated algorithm and the set of thresholds, wherein the thresholds are chosen empirically.

16. The method of claim 15, wherein the predetermined set of categories comprises:
   Text Outline;
   Text Body;
   Background; and
   Non-text.

17. The method of claim 15, further comprising moving the center of the N×N window by J pixels to obtain a subsampled text tag.

18. The method of claim 17, wherein J=3.

19. A method having scanned intensity information as input for detecting text in a scanned page by observing a very strong contrast in a localized region between a dark side and a light side, the method comprising:
   pre-processing for stroke width determination; and contrast-based text detection processing by:
      detecting text preliminarily based on local contrast and stroke width; and
      consistency checking by:
         accumulating a set of statistics using an N×N window of text tags and a set of thresholds; and
         deciding by using the set of statistics if each of the text tags is any of:
            Text Outline;
            Text Body;
            Background; and
            Non-text;
   wherein the localized region comprises a substantially sharp edge between the dark side and the light side; and
   whereby any of black text on white background, black text on color background, and white or light text on a dark background are detected.

20. The method of claim 19, wherein the N×N window further comprises N×N blocks, each block representing J×J pixels.

21. The method of claim 20, wherein N=5 and J=3.

22. The method of claim 19, wherein set the of thresholds comprises a maximum number of Non-text blocks threshold.

* * * * *